(12) United States Patent
Sudak et al.

(10) Patent No.: US 8,948,081 B2
(45) Date of Patent: Feb. 3, 2015

(54) DEVICE, SYSTEM AND METHOD OF MULTIPLE-STREAM WIRELESS COMMUNICATION

(71) Applicant: Intel Corporation, Santa Clara, CA (US)

(72) Inventors: Eran Sudak, Tel Aviv (IL); Solomon B. Trainin, Haifa (IL); Ophir Edlis, Modi'in-Maccabim-Re'ut (IL); Ran Mor, Herzeliya (IL); Oren Kedem, Modiin Maccabim-Reut (IL)

(73) Assignee: Intel Corporation, Santa Clara, CA (US)

(*) Notice: Subject to any disclaimer, the term of this patent is extended or adjusted under 35 U.S.C. 154(b) by 125 days.

(21) Appl. No.: 13/628,675

(22) Filed: Sep. 27, 2012

(65) Prior Publication Data

US 2013/0272272 A1    Oct. 17, 2013

Related U.S. Application Data

(60) Provisional application No. 61/623,701, filed on Apr. 13, 2012.

(51) Int. Cl.
   *H04B 7/212* (2006.01)
   *H04W 72/04* (2009.01)
   *H04W 72/12* (2009.01)

(52) U.S. Cl.
   CPC ...... *H04W 72/0446* (2013.01); *H04W 72/1242* (2013.01)
   USPC ..................................... 370/321; 370/395.41

(58) Field of Classification Search
   CPC ...... H04W 28/26; H04Q 11/04; H04L 12/413
   USPC ......... 370/445, 447, 449, 458, 349, 321, 322, 370/337, 347, 395.41
   See application file for complete search history.

(56) References Cited

U.S. PATENT DOCUMENTS 7,623,542 B2 * 11/2009 Yonge et al. .................. 370/445
7,706,397 B2 *  4/2010 Trainin et al. ................ 370/445
(Continued)

FOREIGN PATENT DOCUMENTS

EP           1195937 A1     4/2002
KR        20110119229      11/2011

OTHER PUBLICATIONS

International Search Report and Written Opinion for PCT Patent Application No. PCT/US2013/036147, mailed on Jul. 26, 2013, 11 pages.

(Continued)

*Primary Examiner* — Brenda H Pham
(74) *Attorney, Agent, or Firm* — Shichrur & Co.

(57) ABSTRACT

Some demonstrative embodiments include devices, systems and/or methods of multiple-stream wireless communication. For example, an apparatus may include a wireless communication unit to perform wireless peer-to-peer (P2P) communication according to a time allocation scheme defining a plurality of scheduled allocations (teeth) for wireless P2P communication within a wireless communication network based on a predefined priority scheme, which assigns a plurality of priorities to a plurality of streams corresponding to a plurality of service types, wherein a tooth may be scheduled for P2P communication between a pair of endpoints of the wireless communication network, and wherein the tooth includes one or more contiguous portions (slices), a slice having a predefined duration allocated for communication of one or more streams having the same priority.

30 Claims, 4 Drawing Sheets

(56) References Cited

U.S. PATENT DOCUMENTS

2006/0007947 A1 1/2006 Li et al.
2007/0183414 A1 8/2007 Hoshino et al.
2010/0195526 A1 8/2010 Stauffer et al.

OTHER PUBLICATIONS

Wireless-Gigabit-Alliance (WGA) specifications (Wireless Gigabit Alliance, Inc WiGig MAC and PHY Specification Version 1.0, Final specification), Apr. 2010.
IEEE 802.11-2007, IEEE Standard for Information Technology—Telecommunications and information exchange between systems—Local and metropolitan area networks—Specific requirements. Part 11: Wireless LAN Medium Access Control (MAC) and Physical Layer (PHY) Specifications, Jun. 2007.
Wi-Fi Alliance Technical Committee P2P Task Group. Wi-Fi Peer-to-Peer (P2P) Technical Specification. Version 1.2; 160 pages; Dec. 14, 2011.
Universal Serial Bus Mass Storage Class—Bulk-Only Transport, Revision 1.0, Sep. 31, 1999; 22 pages.
International Preliminary Report on Patentability for PCT Application No. PCT/US2013/036147, mailed on Oct. 23, 2014, 8 pages.

* cited by examiner

DEVICE, SYSTEM AND METHOD OF MULTIPLE-STREAM WIRELESS COMMUNICATION

CROSS REFERENCE

This application claims the benefit of and priority from U.S. Provisional Patent application No. 61/623,701, entitled "Scheme for Transporting Multiple Streams Over WiGig Under QoS And Thermal Constraints", filed Apr. 13, 2012, the entire disclosure of which is incorporated herein by reference.

BACKGROUND

Some wireless communication technologies may be configured for communication of multiple dedicated services.

For example, the Wireless-Gigabit (WiGig) technology, e.g., according to the *Wireless Gigabit Alliance, Inc WiGig MAC and PHY Specification Version* 1.0, *April* 2010, *Final specification*, is designed to carry multiple dedicated services, such as audio-visual (A/V) and input output (JO).

The WiGig Alliance (WGA) has defined a set of Protocol Abstraction Layers (PALs), e.g., a WiGig Serial Extension (WSE) PAL and a WiGig Display Extension (WDE) PAL, that standardize the method of transporting traffic of specific industry-standard protocols, e.g. Universal Serial Bus (USB) and DisplayPort, over the WiGig media access control (MAC) layer.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
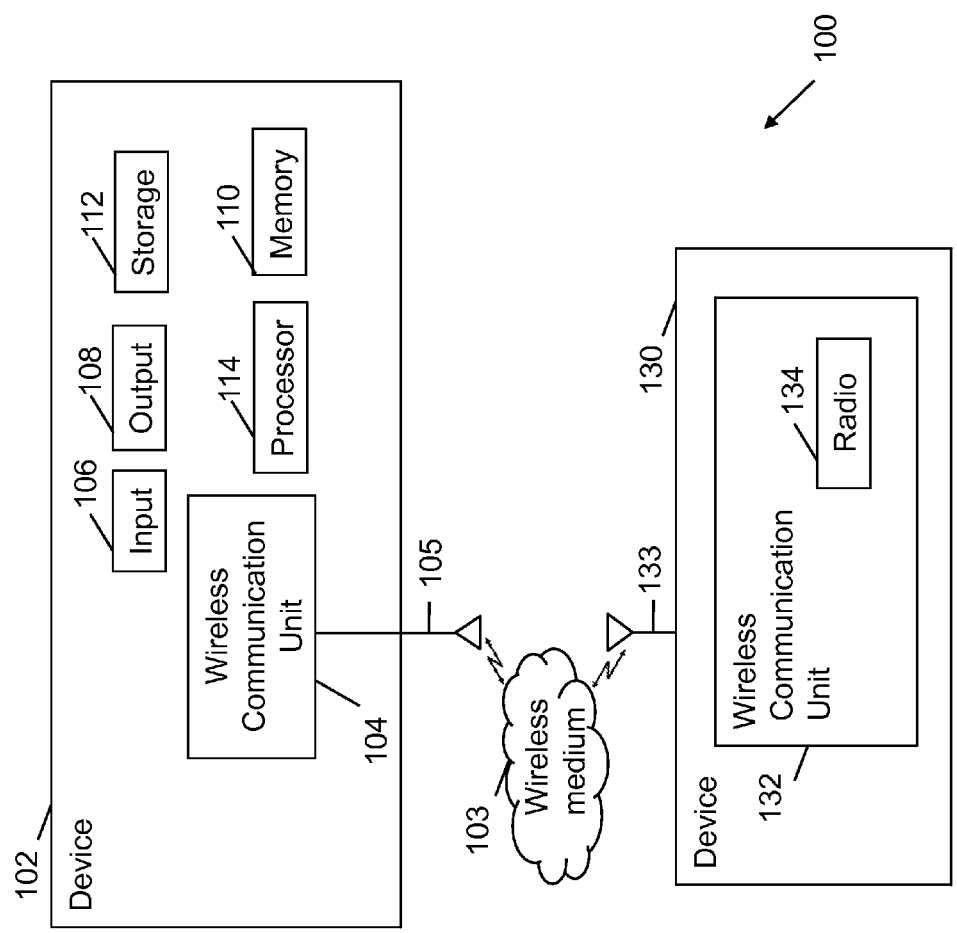
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (*Wireless Gigabit Alliance, Inc WiGig MAC and PHY Specification Version* 1.0, *April* 2010, *Final specification*) and/or future versions and/or derivatives thereof, devices and/or networks operating in accordance with existing WiGig Serial Extension (WSE) protocols (*WiGig Serial Extension (WSE) Specification Draft* 1.02, *August* 2012) and/or future versions and/or derivatives thereof, devices and/or networks operating in accordance with existing WiGig Display Extension (WDE) protocols (*WDE Draft Specification* 1.04, *August* 2012) and/or future versions and/or derivatives thereof, devices and/or networks operating in accordance with existing Bulk Only Transfer (BOT) Protocols (*Universal Serial Bus (USB) Mass Storage Class Bulk-Only Transport, Revision* 1.0, *Sep.* 31, 1999) and/or future versions and/or derivatives thereof, devices and/or networks operating in accordance with existing IEEE 802.11 standards (*IEEE* 802.11-2007, *IEEE Standard for Information Technology—Telecommunications and information exchange between systems—Local and metropolitan area networks—Specific requirements, Part* 11: *Wireless LAN Medium Access Control (MAC) and Physical Layer (PHY) Specifications; IEEE*

802.11n-2009, *IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput*; IEEE802.11 task group ac (TGac) ("*IEEE802.11-09/0308r12—TGac Channel Model Addendum Document*"); IEEE 802.11 task group ad (TGad) (*IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band*), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m*) and/or future versions and/or derivatives thereof, devices and/or networks operating in accordance with existing Wireless—WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrase "service period" (SP), as used herein, may relate to a contiguous time during which one or more individually addressed frames are transmitted to a STA, e.g. a quality of service (QoS) STA, and/or one or more transmission opportunities (TxOPs) are granted to the same STA.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

The phrase "personal basic service set" (PBSS), as used herein, may relate to a basic service set (BSS) that forms a self-contained network. For example, the PBSS may operate in the DMG band, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The phrase "Contention Based Access Period (CBAP)", as used herein, may relate to a time period, during which wireless communication devices may be allowed to communicate using a suitable contention-based mechanism. In one example, the CBAP may include an access period allocated within a Data Transfer Time (DTT) within a beacon interval (BI). The CBAP may include, for example, a time period within the DTT of a DMG Basic Service Set (BSS), e.g., where enhanced distributed channel access (EDCA) is used.

The phrase "Transmit Opportunity (TxOP)", as used herein, may relate to an interval of time when a particular STA, e.g., a QoS STA, has the right to initiate frame exchange sequences onto the WM. A TxOP may be defined, for example, by a starting time and a maximum duration and/or any other parameters. In one example, the TxOP may be obtained by the STA by successfully contending for the channel or assigned by a coordinator.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to-device communication.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, for example, a PC, a desktop computer, a mobile computer, a laptop computer, a notebook computer, a tablet computer, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In one example, one of wireless communication devices 102 and 130 may include a wireless source device, e.g., a computer input device, for example, a keyboard, a mouse, a joystick, a trackball, a remote control, and the like; and/or one of wireless communication devices 102 and 130 may include a wireless destination device, e.g., a display, a printer, a scanner, a storage, and the like.

In some demonstrative embodiments, wireless communication devices 102 and/or 130 may include wireless communication units 104 and/or 132, respectively, to perform wireless communication between wireless communication devices 102 and 130 and/or with one or more other wireless communication devices, e.g., as described below.

Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-screen, a touch-pad, a track-ball, a stylus, a microphone, or other suitable pointing device or input device. Output unit 108 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. For example, antennas 105 and/or 133 may include any suitable configuration, structure and/or arrangement of one or more antenna elements, components, units, assemblies and/or arrays. Antennas 105 and/or 133 may include, for example, antennas suitable for directional communication, e.g., using beamforming techniques. For example, antennas 105 and/or 133 may include a phased array antenna, a single element antenna, a set of switched beam antennas, and/or the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication units 104 and/or 132 include, for example, one or more radios 134, e.g., including one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication devices 102 and 130 may establish a wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102 and 130 may form, or may be part of a wireless communication network. The wireless communication network may include, for example, a P2P network. The network may include, for example, a set of PCP and non-PCP stations connected, e.g., within a PBSS.

In some demonstrative embodiments, wireless communication devices 102 and/or 130 may perform the functionality of DMG stations ("DMG STA"). For example, wireless communication devices 102 and/or 130 may be configured to communicate over the DMG band.

In some demonstrative embodiments, wireless communication units 104 and 132 may communicate a plurality of streams of a plurality of service types ("services"), e.g., including one or more services defined according to a plurality of dedicated protocols, and the like.

The term "stream", as used herein, may include a flow of data pertaining to a particular service type. The stream may be communicated from a first station ("source") of system 100, e.g., a STA implemented by one of wireless communication units 104 and 132, to a second station ("destination") of system 100, e.g., a station implemented by another one of wireless communication units 104 and 132. The stream may include, for example, a bidirectional stream or a unidirectional stream.

In some demonstrative embodiments, a plurality of different priorities may be assigned to the streams of the plurality of service types. The priorities may be assigned to the streams, for example, according to a predefined priority scheme, e.g., as described below.

The priority of a stream may rank the stream, for example, to differentiate or unite the stream with one or more other streams. For example, streams of one or more service types may be provided with a first priority, while one or more streams of one or more other service types may be provided with a second priority, lesser than or greater than the first priority.

In some demonstrative embodiments, the plurality of streams may include, for example, one or more of control streams, audio streams, video streams, periodic streams, non-periodic streams, isochronous (ISO) streams, asynchronous streams, internet-protocol (IP) streams, high priority IP streams, low priority IP streams, WDE streams, WSE streams, bulk streams, Best Effort (BE) streams, BOT streams, and/or any other streams.

In some demonstrative embodiments, wireless communication units 104 and/or 132 may perform wireless communication, e.g., wireless P2P communication, according to a time allocation scheme defining a plurality of scheduled allocations (teeth) for wireless communication within the wireless communication network. A tooth may include single scheduled allocation within a timeline of the time allocation scheme, e.g., as described in detail below.

In some demonstrative embodiments, a particular tooth, e.g., each tooth, may be scheduled for communication, e.g., P2P communication, between a pair of endpoints of the wireless communication network.

For example, wireless communication unit 104 may perform the functionality of a first station and wireless communication unit 132 may perform the functionality of a second station. According to this example, one tooth may be scheduled for communication between the first and second stations, a second tooth may be scheduled for communication between the first station and a third station, a third tooth may be scheduled for communication between the second station and the third station, and/or another tooth may be allocated for communication between another pair of stations.

In some demonstrative embodiments, the particular tooth, e.g., each tooth, may include one or more contiguous portions (slices). A slice, e.g., each slice, may have, for example, a predefined duration allocated for communication of one or more streams having the same priority.

In some demonstrative embodiments, a slice may be allocated for bidirectional communication, e.g., bidirectional P2P communication. Alternatively, the slice may be allocated for unidirectional communication, e.g., unidirectional P2P communication.

In some demonstrative embodiments, one or more parameters of the teeth and/or slices may be defined based on one or more parameters of the plurality of streams.

In some demonstrative embodiments, the one or more parameters of the teeth and/or slices may include, for example, duration of the teeth, spacing between the teeth, duration of the slices, an order of the slices within a tooth and/or any other parameter or attribute.

In some demonstrative embodiments, the one or more parameters of the plurality of streams may include, for example, a latency parameter, a jitter parameter, a bandwidth parameter and/or any other parameter.

In some demonstrative embodiments, the duration of a slice allocated for an isochronous stream may be based on a bandwidth parameter of the stream.

In some demonstrative embodiments, the priority scheme may assign to an isochronous stream a priority greater than a priority of a best-effort stream.

In some demonstrative embodiments, the time allocation scheme may be defined and/or configured by a PCP. For example, wireless communication unit 104 may perform the functionality of a PCP, which may configure the time allocation scheme 200 for communication by one or more devices, e.g., stations, of system 100.

Figure 2:
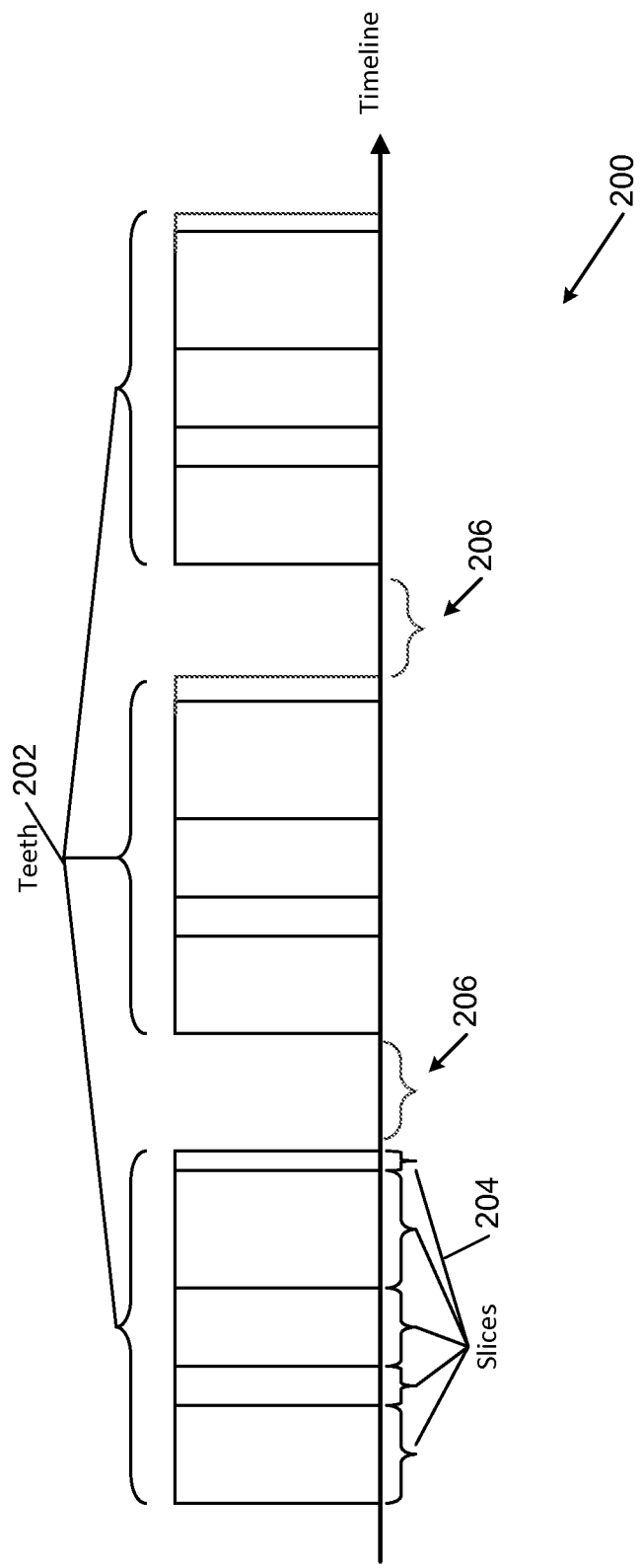
FIG. 2 is a schematic illustration of a time allocation scheme, in accordance with some demonstrative embodiments.

Reference is made to FIG. 2, which schematically illustrates a time allocation scheme 200, in accordance with some demonstrative embodiments. In some demonstrative embodiments, wireless communication devices of a network, e.g., wireless communication devices 102 and/or 130 (FIG. 1), may communicate according to time allocation scheme 200.

As shown in FIG. 2, time allocation scheme 200 may include a sequence of teeth 202, e.g., including one or more slices 204.

In some demonstrative embodiments, two or more of teeth 202, e.g., even all teeth 202, of time allocation scheme 200 may share a common slice allocation, e.g., such that the two or more teeth have an identical allocation of slices 204. For example, first and second teeth 202 may include the same slices 204, at the same order, and having the same duration.

Additionally or alternatively, in some demonstrative embodiments, two or more of teeth 202, e.g., even all teeth 202, of time allocation scheme 200 may have an irregular allocation of slices, e.g., such that the two or more teeth have different allocations of slices 204. For example, first and second teeth 202 may include different slices 204, a different order of the same slices 204, and/or different durations of slices 204.

In some demonstrative embodiments, a pair of consecutive teeth 202 may be separated by a time period 206.

In some demonstrative embodiments, the wireless communication devices of the network may communicate during teeth 202, e.g., to exchange regular traffic. For example, the wireless communication devices of the network may be allowed communicate only during teeth 202, e.g., while not being allowed to communicate during time periods 206. Time periods 206 may be utilized, for example, for conserving power of one or more of the wireless communication devices, e.g., by switching one or more of the wireless communication devices to a reduced power mode, e.g., a power-save mode, an idle mode, and the like.

In some demonstrative embodiments, two or more of time periods 206, e.g., even all time periods 206, of time allocation scheme 200 may share a common duration, for example, such that at least first and second pairs of consecutive teeth 202, e.g., each pair of consecutive teeth 202, may be separated by the same time period 206.

Additionally or alternatively, in some demonstrative embodiments, two or more of time periods 206, e.g., even all of time periods 206, of time allocation scheme 200 may have two or more different durations.

In some demonstrative embodiments, a tooth 202 may be allocated for traffic exchanged between a pair of endpoints of the network. Different teeth 202 may correspond to different endpoint pairs of the network. For example, one tooth 202 may be allocated for a first pair of endpoints of the network, e.g., including first and second stations; another tooth 202 may be allocated for a second pair of endpoints of the network, e.g., including third and fourth stations; another 202 may be allocated for a third pair of endpoints of the network, e.g., including the first and third stations; another tooth 202 may be allocated for a fourth pair of endpoints of the network, e.g., including the first and fourth stations; and/or another tooth may be allocated for any other pair of stations.

In some demonstrative embodiments, a tooth 202 may have a pre-defined duration, which may set an upper bound for traffic flow within the tooth 202.

In some demonstrative embodiments, two or more of teeth 202, e.g., even all teeth 202, of time allocation scheme 200 may share a common tooth duration, for example, such that at least first and second teeth 202, e.g., all teeth 202, may be have the same tooth duration.

Additionally or alternatively, in some demonstrative embodiments, two or more of teeth 202, e.g., even all of teeth 202, of time allocation scheme 200 may have two or more different durations.

In some demonstrative embodiments, a slice 204, e.g., each slice 204, may be allocated to carry traffic of one or more streams having the same priority.

In some demonstrative embodiments, at least one slice 204 may be allocated for bidirectional communication, e.g., between the pair of endpoints allocated to use a tooth 202 including the slice 204.

In some demonstrative embodiments, at least one slice 204 may be allocated for unidirectional communication, e.g., by one endpoint of the pair of endpoints allocated to use a tooth 202 including the slice 204. For example, the pair of endpoints may include a source station and a destination station, and the slice may be allocated for unidirectional communication by the source station.

In some demonstrative embodiments, bandwidth (BW) may be allocated for communication of one or more streams between the pair of endpoints during a particular slice 124, for example, according to a BW allocation scheme, e.g., for allocating one or more portions of the slice 124 for communication from the source station and/or one or more portions of the slice 124 for communication from the destination station. In one example, the BW allocation scheme may include a first, e.g., "fair", allocation scheme, which allocates equal portions of the BW to the source and destination stations. For example, slice 124 may be allocated to a single stream, and the source and destination stations may each be allocated 50% of the slice. In another example, the BW allocation scheme may include a second, e.g., "unfair", allocation scheme, which allocates unequal portions of the BW to the source and destination stations. For example, slice 124 may be allocated to first and second streams, the source of the first stream may be allocated a first portion of slice 124, e.g., 40%, the destination of the first stream may be allocated a second portion of slice 124, e.g., 20%, the source of the second stream may be allocated a third portion of slice 124, e.g., 30%, and the destination of the second stream may be allocated a fourth portion of slice 124, e.g., 10%.

In some demonstrative embodiments, a slice 204 may have a pre-defined duration, which may set an upper bound for traffic flow within the slice 204.

In some demonstrative embodiments, a particular tooth 202 may be truncated, e.g., ad-hoc, for example, if the endpoints to which the particular tooth 202 is allocated do not have data to transfer. Accordingly, the network may assume power save at an earlier point of time. For example, a tooth 202 may be allocated for communication between wireless communication units 104 and 132 (FIG. 1), and wireless communication unit 104 (FIG. 1) and/or wireless communication unit 132 (FIG. 1) may truncate the particular tooth 202, e.g., if there is no data to be transferred between wireless communication units 104 and 132 (FIG. 1).

In some demonstrative embodiments, a particular slice 204 may be truncated, e.g., ad-hoc, for example, if the endpoints do not have data to transfer via the stream to which the particular slice 204 is allocated.

In some demonstrative embodiments, a freed bandwidth resulting from the truncation of the particular slice 204 may be appended to another slice 204 within the same tooth 202 including the particular slice 204. The entire tooth 202 including the particular slice 204 may be truncated, e.g., ad-hoc, for example, if all streams of the endpoints do not have data to transfer. Accordingly, the network may assume power save at an earlier point of time. For example, a tooth 202 may be allocated for communication between wireless communication units 104 and 132 (FIG. 1), the tooth 202 may include a particular slice 204 allocated for a particular stream, and wireless communication unit 104 (FIG. 1) and/or wireless communication unit 132 (FIG. 1) may truncate the particular slice 204, e.g., if there is no data to be transferred between wireless communication units 104 and 132 (FIG. 1) via the particular stream.

In some demonstrative embodiments, time allocation scheme 200 may be defined and/or configured by a PCP. For example, wireless communication unit 104 (FIG. 1) may perform the functionality of a PCP, which may configure time allocation scheme 200 for communication by one or more devices, e.g., stations, of system 100 (FIG. 1).

In some demonstrative embodiments, the PCP may define time allocation scheme 200 based on and/or while considering one or more allocation requests from one or more non-PCP stations. For example, wireless communication unit 104 (FIG. 1) may receive an allocation request from a non-PCP station, e.g., from wireless communication unit 132 (FIG. 1), and may define time allocation scheme 200 based on the request from the non-PCP station.

In some demonstrative embodiments, time allocation scheme 200 may be configured by defining one or more parameters of teeth 202 and/or slices 204.

In some demonstrative embodiments, the one or more parameters of teeth 202 and/or slices 204 may be defined based on one or more parameters of the plurality of streams to be communicated between the endpoints of the network, e.g., one or more streams to be communicated between one or more stations of system 100 (FIG. 1).

In some demonstrative embodiments, the one or more parameters of the plurality of streams may include, for example, a latency parameter, a jitter parameter, a bandwidth parameter and/or any other parameter. For example, a stream may have a latency requirement, a jitter requirement and/or a bandwidth requirement, and time allocation scheme 200 may be configured, e.g., to conform to the latency requirement, the jitter requirement and/or the bandwidth requirement of the stream.

In some demonstrative embodiments, time allocation scheme 200 may be configured by defining a duration of teeth 202, the spacing 206 between teeth 202, the duration of slices 204, an order of slices 204 within a tooth 202 and/or any other parameter or attribute.

In some demonstrative embodiments, a tooth duty cycle, which may be defined as a relationship between the duration of a tooth 202 ("tooth duration") and a duration of period 206 ("inactive duration"), may be configured and/or adjusted, for example, to satisfy one or more thermal constraints of one or more devices of system 100 (FIG. 1).

For example, a mobile device, e.g., device 102 (FIG. 1), may have limited thermal dissipation capabilities, while a radio of the mobile device, e.g., radio 134 (FIG. 1), when working at full capacity, may dissipate more heat than the mobile device may be able to handle. An overall thermal dissipation of radio 134 (FIG. 1) may be capped into an envelope, e.g., according to a Configurable Thermal Dissipation Profile (cTDP), that can be handled by device 102 (FIG. 1).

In some demonstrative embodiments, the mobile device, e.g., device 102 (FIG. 1), may be configured to switch to a reduced power mode, e.g., an idle mode, a sleep mode, and the like, during one or more of periods 206.

In one example, time allocation scheme 200 may be configured to have a tooth duty cycle, which is based on the cTDP of device 102 (FIG. 1). For example, the tooth duty cycle of time allocation scheme 200 may be decreased, e.g., by decreasing a ratio between the tooth duration and the inactive duration, in order to decrease an expected thermal dissipation of device 102 (FIG. 1).

In some demonstrative embodiments, a tooth periodicity of a plurality of teeth 202, which include slices 204 corresponding to one or more particular streams, may be defined as the duration between the beginning of two consecutive teeth of the plurality of teeth. The tooth periodicity of the plurality of teeth 202 may be configured and/or adjusted to satisfy the latency requirements of the one or more particular streams, e.g., each of the particular streams. For example, the tooth periodicity may be reduced to reduce latency. Additionally or alternatively, reduction of latency may be achieved with respect to a particular stream, for example, by allocating more than one slice 204 for the particular stream within a particular tooth 202, thereby effectively providing the particular stream with more opportunities to communicate.

In some demonstrative embodiments, the priority streams ("greedy" streams) which may be configured to consume as much bandwidth as possible, may be lower than the priority of isochronous streams, e.g., with bound traffic characteristics. For example, the greedy streams may include best effort streams, which may not incorporate strict latency requirements and/or may cope well with momentary starvation.

In some demonstrative embodiments, a higher priority, e.g., even a highest priority, may be assigned to Management and/or Control traffic, e.g., since such traffic may have a relatively high level of importance, while usually requiring relatively low bandwidth.

In some demonstrative embodiments, a duration of a slice 204 allocated for an isochronous stream may be based on a bandwidth (BW) parameter, e.g., a BW requirement, of the stream.

In one example, the duration of the slice 204 allocated for a particular stream may be determined based on an average BW requirement of the particular stream. According to this example, a variable bit rate (VBR) stream may be "stretched" or "smeared" over a few teeth 202.

In another example, the duration of the slice 204 allocated for the particular stream may be determined based on an average BW requirement of the particular stream. For example, the duration of the slice 204 allocated for the particular stream may be configured to enable a BW greater than the average BW, e.g., as much as the peak BW of the particular stream. According to this example, the particular slice 204 may be truncated ad-hoc, e.g., if there is no more data of the particular stream ready for transmission. The allocation of the slice duration according to the average and/or peak bandwidth of the stream may be viable, for example, if sufficient BW budget is available in a tooth 202 including the particular slice 204.

In some demonstrative embodiments, the priority scheme may assign to an isochronous stream a priority greater than a priority of a BE stream.

For example, slice duration of slices 204 allocated for BE streams may be set to allow a certain minimum BW. This allocation may be useful, for example, for creating a guaranteed small "pipe" for the possible exchange of low BW control messages, e.g. TCP Acknowledgements (ACKs), and the like. Additionally, the best effort streams may utilize opportunistic BW allocation provided by the momentary truncation of slices 204, which are allocated for the isochronous steams, e.g., the VBR streams, with higher priority.

In some demonstrative embodiments, the slice duration of a slice 204 may be configured based on variation in the quality of the wireless link between the endpoints utilizing the slice 204, e.g., since the variations in quality may impact the effective data transmission rate, frame retransmission and/or data rate adaptation.

Referring back to FIG. 1, in some demonstrative embodiments, wireless communication units 104 and 132 may perform the functionality of DMG stations, which may communicate as part of a network, e.g., a WiGig network.

Some demonstrative embodiments are described below with respect to DMG stations and/or a WiGig network. However, other embodiments may be implemented with respect to any other stations and/or any other network.

In some demonstrative embodiments, wireless communication devices 102 and 130 may communicate over the DMG band, e.g., in accordance with the WiGig Specifications. For example, devices 102 and 130 may employ directional RF signals. Such directional signals may be created by at least one antenna array, e.g., by beamforming techniques. In other embodiments, wireless communication devices 102 and 130 may communicate over any other band and/or according to any other protocol and/or specification.

The WiGig technology is designed to carry multiple dedicated services, such as audio visual (A/V) and input output (IO). To this end, the WGA has defined a set of Protocol Abstraction Layers (PALs) that standardize the method of transporting traffic of specific industry-standard protocols, e.g. USB and/or DisplayPort, over the WiGig media access control (MAC) layer.

While the PAL specifications focus on establishing and maintaining a meaningful PAL link, and standardize the way to exchange data packets that pertain to a specific protocol, the exact way to interact between the PAL and the WiGig Medium Access Control (MAC), and even further—multiple PALs and the WiGig MAC, is left as an implementation choice and not defined anywhere. In other words, the WiGig PAL and MAC specifications provide a set of tools, and it is up to the implementer to decide how to put these tools to use within a coherent scheme.

The WiGig PALs include, for example, a WSE PAL, which may be used, for example, to carry USB traffic, which may include non-periodic (NP) traffic, e.g., bulk and/or control streams, and/or periodic traffic, e.g., Isochronous and/or Interrupt, which may be communicated by end points scattered over multiple devices in a USB tree. The periodic traffic may be required to be conducted under a certain BW and latency Service Level Agreement (SLA), while the NP traffic may be communicated according to a BE, potentially "greedy", scheme, which may be less sensitive to latency. There may also be some, e.g., low, BW requirements for management and/or control traffic of the WSE PAL.

The WiGig PALs may also include, for example, a WDE PAL, which may be used to carry video and audio traffic, e.g., multi monitor traffic. The bulk majority of this type of traffic may be isochronous with variable bit rate, e.g., depending on the momentary outputs of a video and/or audio encoder. There may also be some, e.g., low, BW requirements for management and/or Control traffic of the WDE PAL.

The WiGig MAC may also communicate native IP traffic, e.g., similar to legacy Wi-Fi radios. The IP traffic may typically be considered single-priority, best effort traffic, although the IP specification does provide a means for an application to tag certain IP flows as higher priority.

WiGig products may be incorporated into a platform, e.g., a mobile device, an Ultrabook and the like, with limited thermal dissipation capabilities. A WiGig radio, e.g., radio 134 (FIG. 1), working at full capacity may dissipate more heat than the platform can handle. Thus, there is value in being able to cap the overall thermal dissipation of the radio into an envelope that can be handled by the platform into which it is integrated.

Some demonstrative embodiments may be implemented, for example, to address how to combine multiple PALs, e.g., WSE (USB PAL), WDE (AV PAL) and/or any other PAL, over the WiGig MAC, e.g., as described below.

Some demonstrative embodiments may enable combining the multiple PALs, for example, while adhering to QoS constraints, Thermal constraints, and/or other constraints and/or requirements.

In one example, some demonstrative embodiments may support QoS for multiple streams, e.g., while complying with a TDP envelope constraint. These embodiments may be implemented, for example, for a WiGig product, e.g., a mobile device, an Ultrabook, and the like, which may be required to convey A/V and/or ISO USB streams, e.g., while substantially providing "wired-equivalent" user experience, together with Bulk (greedy) traffic, e.g., while maintaining a relative low or reduced power consumption.

In another example, some demonstrative embodiments may support multiple WSE, WDE and IP streams concurrently, with their respective SLAs, and may potentially by extended to support more streams.

In another example, some demonstrative embodiments may facilitate a fair and very efficient bi-directional data transfer, e.g., with reduced or minimal link access overheads.

In another example, some demonstrative embodiments may adhere to an arbitrarily pre-defined thermal dissipation envelope in both PCP and the non-PCP stations.

In another example, some demonstrative embodiments may enable enforcing QoS and/or thermal constraints by a PCP station.

In another example, some demonstrative embodiments may enable the PCP station to be aware of the implementation details of the time allocation scheme, e.g., while non-PCP stations may not be aware of the implementation details of the time allocation scheme.

In another example, some demonstrative embodiments may ensure that one or more stations, e.g., rogue stations, cannot cause the PCP station to breach a thermal envelope.

In some demonstrative embodiments, a time allocation scheme, e.g., time allocation scheme 200 (FIG. 2), may be configured based on one or more WiGig features, e.g., with respect to a network including two members, for example, a PCP station and a non-PCP station. For example, wireless communication unit 104 may perform the functionality of the PCP station and wireless communication 132 may perform the functionality of the non-PCP station. In other embodiments, the time allocation scheme, e.g., time allocation scheme 200 (FIG. 2), may be configured with respect to a network including any other number and/or type of members and/or stations.

In some demonstrative embodiments, a time allocation scheme, e.g., time allocation scheme 200 (FIG. 2), may be configured to support one or more of the following streams corresponding to the following plurality of service types, e.g., all of the following streams:
 WDE video, e.g., including two streams to support a Dual Display configuration;
 WDE audio, e.g., including two streams to support a Dual Display configuration;
 WDE management/control;
 WSE USB periodic, e.g., including an aggregate of all the ISO Endpoints (EPs) in a USB tree;
 WSE USB non-periodic, e.g., including an aggregate of all the non-ISO EPs in the USB tree;
 WSE management/control;
 IP high priority;
 IP low priority;
 WiGig MAC management, which may optionally be carried as part of the Announcement Time (AT), e.g., instead of being assigned to a dedicated slice;
 802.1x In some demonstrative embodiments, a tooth 202 (FIG. 2) of time allocation scheme 200 (FIG. 2) may be allocated for communication, e.g., P2P communication, between a source station and a destination station.

In some demonstrative embodiments, the tooth 202 (FIG. 2) may be allocated during a contention-based-access-period (CBAP), which may be allocated to the source and destination stations. In other embodiments, the tooth 202 (FIG. 2) may be allocated during another time period allocated to the source and destination stations, e.g., a Service Period (SP).

For example, teeth 202 (FIG. 2) of time allocation scheme 200 (FIG. 2) may be allocated according to a grid of regular allocations using Unicast-to-Unicast allocated CBAP. In one example, for each particular tooth 202 (FIG. 2), the source and destination of the Unicast-to-Unicast Allocated CBAP may be selected to be the network entities that are to participate in communication during the tooth 202 (FIG. 2).

In some demonstrative embodiments, the tooth 202 (FIG. 2) may be truncated ad-hoc, e.g., in case no more data is available for transmission at either the source or destination, for example, by using an End of Service Period (EOSP), a Power management field, and the like.

In some demonstrative embodiments, the tooth periodicity ("tooth interval") of teeth 202 (FIG. 2) may be set, for example, to be between 2-16 milliseconds (ms), e.g., about 4 ms, which may provide a relatively good tradeoff considering the streams defined above.

In some demonstrative embodiments, the tooth duration of teeth 202 (FIG. 2) may be set, for example, based at least on TDP constraints of a target platform, e.g., devices 102 and/or 130. For example, if the tooth interval is set to 4 ms, then a 2 ms/2 ms on/off assignment (e.g., a tooth duration of 2 ms) may realize a power reduction of about 50%, a 3 ms/1ms on/off assignment (e.g., a tooth duration of 3 ms) may realize a power reduction of about 25% power reduction, and so on.

In some demonstrative embodiments, time allocation scheme 200 (FIG. 2) may be allocated based on a predefined priority scheme, which assigns a plurality of priorities to the plurality of streams, e.g., as described below.

In some demonstrative embodiments, the priority scheme may assign a first priority, for example, to the control streams, a second priority, lesser than the first priority, for example, to the audio streams, and at least a third priority, lesser than the second priority, to other streams.

In one example, the priority scheme may assign the third priority, for example, to periodic streams, and a fourth priority, lesser than the third priority, for example, to video streams.

In some demonstrative embodiments, the priority scheme may assign a fifth priority, lesser than the fourth priority, for example, to high-priority IP streams, and at least a sixth priority, lesser than the fifth priority, for example to bulk streams and low-priority IP streams.

In one example, the priority scheme may group the streams defined above into the following User Priority (UP) levels, e.g., from highest priority to lowest priority:
 1. Priority 1: Control (Ctrl) e.g., WSE, WDE, 802.1x;
 2. Priority 2: WDE Audio 1,2 (2 Streams);
 3. Priority 3: WSE Periodic;
 4. Priority 4: WDE Video 1,2 (2 Streams);
 5. Priority 5: IP High Priority (Pri);
 6. Priority 6: IP Low Pri (BE)+WSE Non-Periodic (Bulk).

In some demonstrative embodiments, one or more management streams, e.g., a MAC Management stream, may be communicated either during AT Access Period, or mapped into one of the priorities, e.g., UP 1.

In some demonstrative embodiments, a traffic stream, e.g., each traffic stream identified by a traffic stream identifier (TSID), may be mapped to a priority, e.g., one of the six priorities defined above. Multiple TSIDs may be mapped to the same priority.

In some demonstrative embodiments, a priority level, e.g., each priority level, may be assigned with a slice allocation 204 (FIG. 2) within a tooth 202 (FIG. 2), for example, according to the priority level, e.g., a first slice will carry Priority 1, a second slice Priority 2 and so forth; a last slice will carry Priority 6.

In other demonstrative embodiments, any other priority scheme and/or time allocation scheme may be utilized.

In some demonstrative embodiments, a slice 204 (FIG. 2), e.g., each slice, within a tooth 202 (FIG. 2) may be allocated by a transmit-opportunity (TxOP).

In some demonstrative embodiments, the source station may announce a TxOP corresponding to the slice 204 (FIG. 2) by announcing the TxOP with the maximum allocated time, e.g., assuming that all the streams that are grouped into the same Priority/slice share the same source station. Alternatively, two or more TxOPs may be used per slice 204 (FIG. 2).

In some demonstrative embodiments, each TxOP may carry a single UP, e.g., in order to comply with the WiGig specification.

In some demonstrative embodiments, the source station may allow the destination station to transmit during the TxOP.

In some demonstrative embodiments, the source station may allow transmission of any UP or per access category (AC), for example, if the destination station is allowed to transmit during the TxOP.

In some demonstrative embodiments, utilizing the TxOP for allocation of the slice 204 (FIG. 2) may have the advantage of forcing both endpoints, e.g., the source and destination stations, to communicate data pertaining only to a particular priority, while limiting the amount of time available for this communication.

In some demonstrative embodiments, the slice 204 (FIG. 2) may be truncated ad-hoc, in case no more data is available for transmission at either side, for example, by sending a contention-free end (CF-END) frame. Accordingly, the remaining slice duration may be appended to a next, e.g., lower Priority, slice, or eliminated, e.g., to enable better power consumption. If the last slice, e.g., Priority 6, has no more data to transmit at either endpoint, it may be possible to either truncate the tooth containing the slice, or to start another "round" of slices, e.g., while giving Priority 1 another opportunity to communicate, followed by Priority 2, and so on.

In some demonstrative embodiments, the regular periodic slice allocations described above may be overridden by non-periodic, higher priority activities, such as, for example, Beam Forming. These higher priority activities may also be required conform to the tooth allocation.

In some demonstrative embodiments, data exchange within a TxOP may be performed using a Reverse Direction mechanism, which may provide the destination station with an equal opportunity to converse with the source station, for example, while maintaining a relatively efficient link access, e.g., with very low access overheads.

Figure 3:
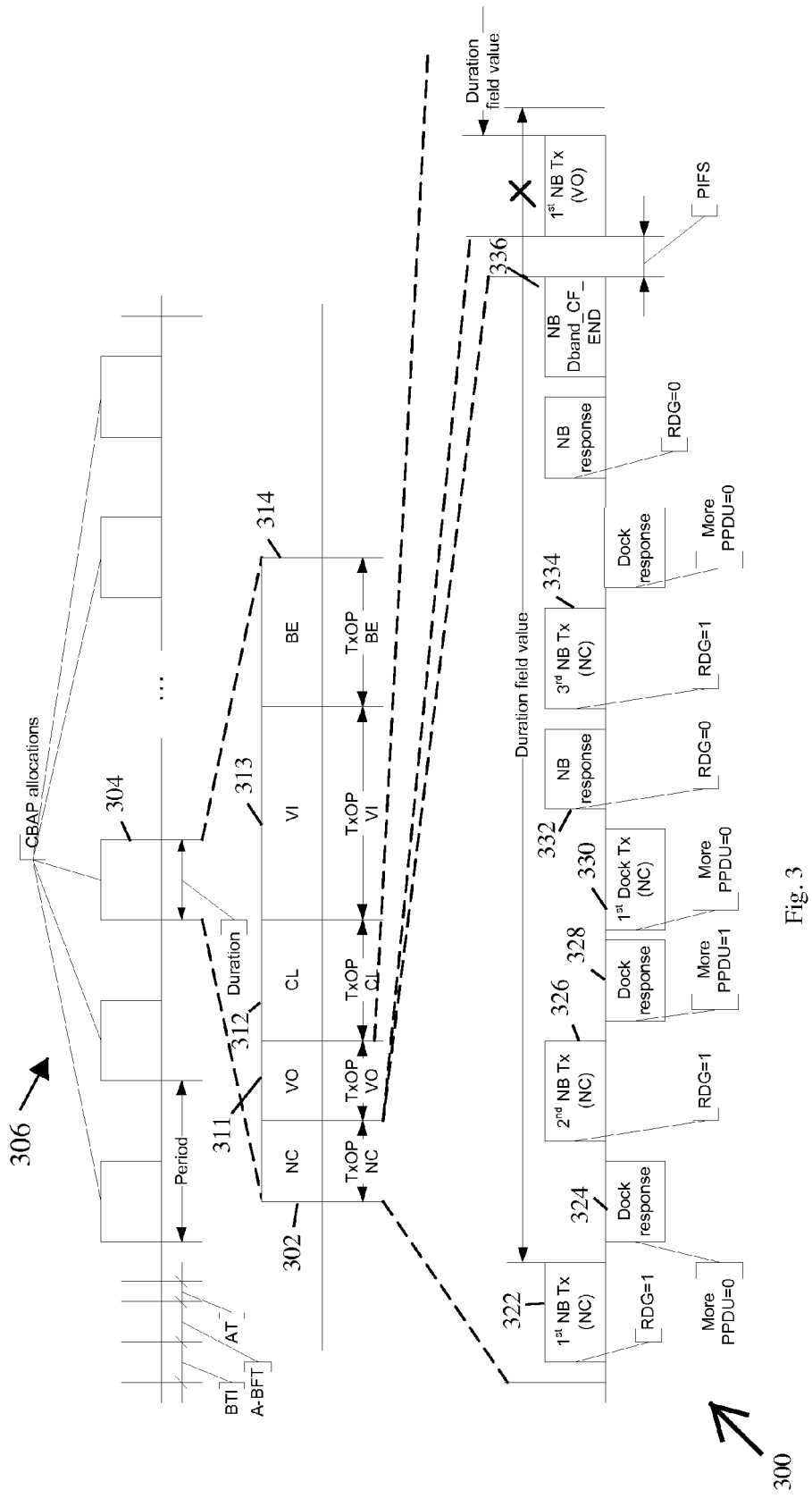
FIG. 3 is a schematic illustration of a sequence of frames exchanged between first and second stations during a slice, in accordance with some demonstrative embodiments.

Reference is made to FIG. 3, which schematically illustrates a sequence 300 of frames communicated between first and second stations within a slice 302 of a tooth 304 of a time allocation scheme 306, in accordance with some demonstrative embodiments. In some demonstrative embodiments, wireless communication units 104 and 132 (FIG. 1) may communicate the sequence 300, e.g., during a slice 204 (FIG. 2).

As shown in FIG. 3, time allocation scheme 306 may include a plurality of teeth, e.g., including tooth 304, which may be allocated during a respective plurality of CBAPs, e.g., as described above.

As shown in FIG. 3, tooth 304 may include a plurality of slices, e.g., including slice 302, allocated for Network Control (NC) traffic, which may be followed by a slice 311 allocated for Voice (VO) traffic, which in turn may be followed by a slice 312 allocated for CL traffic, which in turn may be followed by a slice 313 allocated for Video (VI) traffic, which in turn may be followed by a slice 314 allocated for BE traffic. As also shown in FIG. 3, slices 302, 311, 312, 313 and 314 may be allocated, for example, during a sequence of TxOPs.

In some demonstrative embodiments, the communication during a slice, e.g., slice 302, may utilize a reverse direction grant (RDG) mechanism, e.g., to enable bidirectional communication during the slice.

For example, as shown in FIG. 3, slice 302 may be utilized for communication between a source station, e.g., a Netbook (NB), and a destination station, e.g., a docking station ("dock"). The source station may transmit a frame 322 including NC traffic to the destination station and having an RDG bit set to a first RDG value, e.g., "1", to indicate that the destination is allowed to transmit data. The destination station may respond with a response 324 having an indication bit ("more PPDU") set to a first value, e.g., zero, to indicate that the destination station does not have data ready for transmission. The source station may transmit a frame 326 including NC traffic to the destination station and having the RDG bit set to the first RDG value. The destination station may respond with a response 328 having the indication bit set to a second value, e.g., one, to indicate that the destination station does have data ready for transmission, followed by a frame 330 including NC traffic for the source station, and having the indication bit set to the first value, to indicate that the destination station does not have additional data ready for transmission. The source station may transmit a response frame 332 having the RDG bit set to a second value, e.g., zero, to indicate that the destination station is not allowed to transmit, followed by a frame 334 including NC traffic to the destination station and having the RDG bit set to the first RDG value. The source station may transmit a truncation frame 336, e.g., a DBand CF-END frame, to truncate slice 302, e.g., if both the source station and destination station do not have data ready for transmission.

Figure 4:
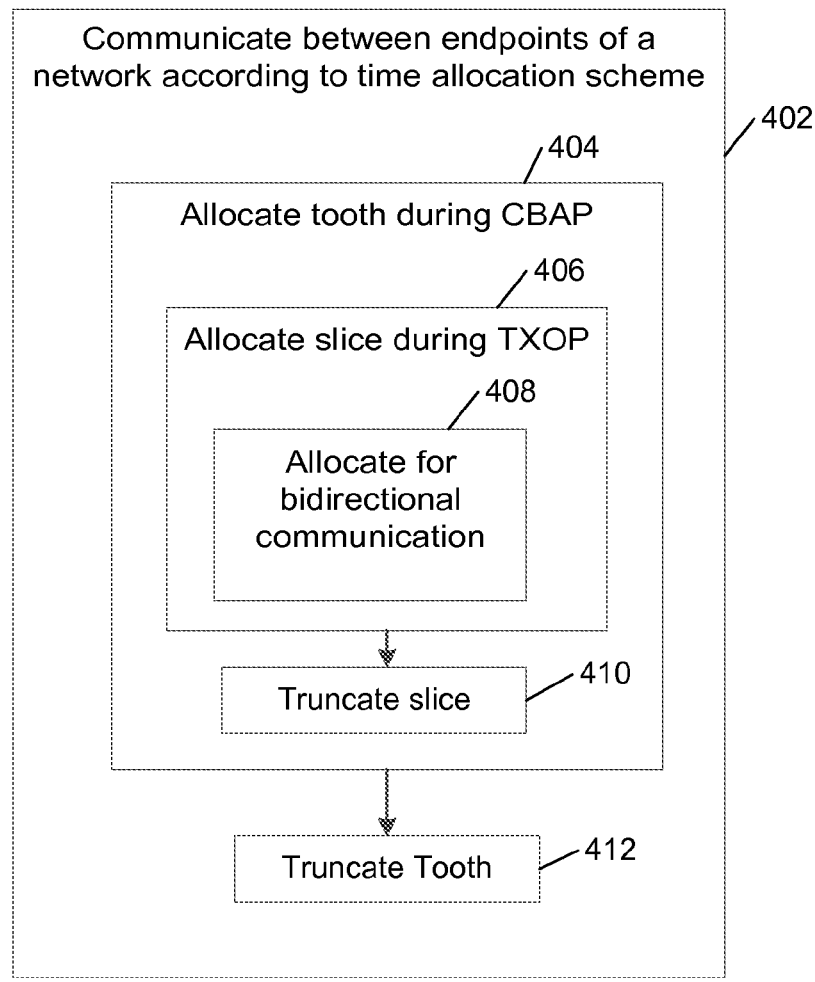
FIG. 4 is a schematic flow-chart illustration of a method of multiple-stream wireless communication, in accordance with some demonstrative embodiments.

Reference is made to FIG. 4, which schematically illustrates a method of multiple-stream communication, in accordance with some demonstrative embodiments. In some embodiments, one or more of the operations of the method of FIG. 4 may be performed by a wireless communication system e.g., system 100 (FIG. 1); a wireless communication device, e.g., devices 102 and/or 130 (FIG. 1); and/or a wireless communication unit, e.g., wireless communication units 104 and/or 132 (FIG. 1).

As indicated at block 402, the method may include communicating within a wireless communication network according to a time allocation scheme defining a plurality of scheduled teeth for wireless communication based on a predefined priority scheme, which assigns a plurality of priorities to a plurality of streams corresponding to a plurality of service types. For example, each tooth may be scheduled for communication, e.g., P2P communication, between a pair of endpoints of the wireless communication network, wherein each tooth includes one or more slices, each slice having a predefined duration allocated for communication of one or more streams having the same priority, e.g., as described above.

As indicated at block 404, communicating within the wireless communication network according to the time allocation scheme may include allocating a tooth during a CBAP allocated to source and destination stations. For example, tooth 304 (FIG. 3) may be allocated during a CBAP for communication between wireless communication units 104 and 132 (FIG. 1), e.g., as described above.

As indicated at block 406, communicating within the wireless communication network according to the time allocation scheme may include allocating a slice within the tooth during a TxOP allocated to the source and destination stations. For example, slice 302 (FIG. 3) may be allocated during a TxOP for communication of NC streams between wireless communication units 104 and 132 (FIG. 1), e.g., as described above.

As indicated at block 408, communicating within the wireless communication network according to the time allocation scheme may include allocating the slice for bidirectional P2P communication. For example, slice 302 (FIG. 3) may be allocated for bidirectional communication of NC traffic, e.g., as described above.

As indicated at block 410, communicating within the wireless communication network according to the time allocation scheme may include truncating the slice, e.g., if there is no data of a stream assigned to the slice ready for transmission from the source and destination stations. For example, wireless communication unit 104 (FIG. 1) may communicate with wireless communication unit 132 (FIG. 1) during slice 302 (FIG. 3), and may truncate the slice 302 (FIG. 3), if wireless communication unit 104 (FIG. 1) and wireless communication unit 132 (FIG. 1) do not have NC data ready for transmission.

As indicated at block 412, communicating within the wireless communication network according to the time allocation scheme may include truncating the tooth, e.g., if there is no data ready for transmission from the source and destination devices. For example, wireless communication unit 104 (FIG. 1) may communicate with wireless communication unit 132 (FIG. 1) during tooth 304 (FIG. 3), and may truncate the tooth 304 (FIG. 3), if wireless communication unit 104 (FIG. 1) and wireless communication unit 132 (FIG. 1) do not have data ready for transmission.

Figure 5:
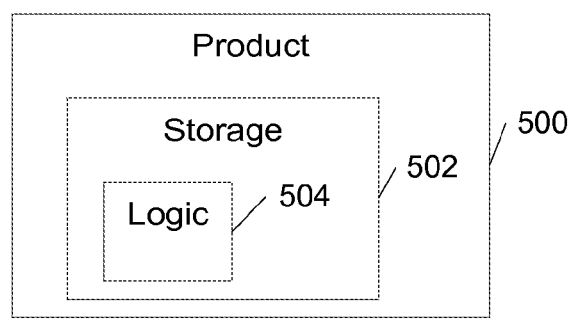
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), device 130 (FIG. 1), wireless communication unit 104 (FIG. 1), wireless communication unit 132 (FIG. 1) and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus comprising:
a wireless communication unit to perform wireless peer-to-peer (P2P) communication according to a time allocation scheme, which defines a plurality of scheduled allocations (teeth) for wireless P2P communication within a wireless communication network based on a predefined priority scheme, the priority scheme assigns a plurality of priorities to a plurality of streams corresponding to a plurality of service types,
wherein each tooth is scheduled for P2P communication between a pair of endpoints of the wireless communication network,
and wherein each tooth includes one or more contiguous portions (slices), each slice having a predefined duration allocated for communication of one or more streams having the same priority.

2. The apparatus of claim 1, wherein one or more parameters of said teeth and slices are defined based on one or more parameters of said plurality of streams.

3. The apparatus of claim 2, wherein the one or more parameters of said teeth and slices include at least one parameter selected from the group consisting of a duration of said teeth, a spacing between said teeth, a duration of said slices, and an order of said slices within said tooth.

4. The apparatus of claim 2, wherein the one or more parameters of said plurality of streams include at least one parameter selected from the group consisting of a latency parameter, a jitter parameter and a bandwidth parameter.

5. The apparatus of claim 4, wherein a duration of a slice allocated for an isochronous stream is based on a bandwidth parameter of said streams.

6. The apparatus of claim 1, wherein said slice is allocated for bidirectional P2P communication.

7. The apparatus of claim 1, wherein said wireless communication unit is to truncate a particular tooth, if there is no data to be transferred.

8. The apparatus of claim 1, wherein said wireless communication unit is to truncate a particular slice, if there is no data to be transferred.

9. The apparatus of claim 1, wherein said priority scheme assigns to an isochronous stream a priority greater than a priority of a best-effort stream.

10. The apparatus of claim 1, wherein a tooth is allocated for P2P communication between a source station and a destination station, and wherein said tooth is allocated during a contention-based-access-period (CBAP) allocated to said source and destination stations.

11. The apparatus of claim 10, wherein a slice within said tooth is allocated by a transmit-opportunity (TxOP).

12. The apparatus of claim 11, wherein said TxOP is announced by said source station, and wherein said source station is to allow said destination station to transmit during said TxOP.

13. The apparatus of claim 1, wherein said priority scheme assigns a first priority to control streams, a second priority, lesser than said first priority, to audio streams, and at least a third priority, lesser than said second priority, to other streams.

14. The apparatus of claim 13, wherein said priority scheme assigns said third priority to periodic streams, and a fourth priority, lesser than said third priority, to video streams.

15. The apparatus of claim 14, wherein said priority scheme assigns a fifth priority, lesser than said fourth priority, to high-priority internet-protocol (IP) streams, and at least a sixth priority, lesser than said fifth priority, to bulk streams and low-priority IP streams.

16. The apparatus of claim 1, wherein said time allocation scheme is allocated by a central point of said wireless communication network.

17. A method comprising:
communicating within a wireless communication network according to a time allocation scheme defining a plurality of scheduled allocations (teeth) for wireless peer-to-peer (P2P) communication based on a predefined priority scheme, which assigns a plurality of priorities to a plurality of streams corresponding to a plurality of service types,
wherein each tooth is scheduled for P2P communication between a pair of endpoints of the wireless communication network,
and wherein each tooth includes one or more contiguous portions (slices), each slice having a predefined duration allocated for communication of one or more streams having the same priority.

18. The method of claim 17, wherein one or more parameters of said teeth and slices are defined based on one or more parameters of said plurality of streams.

19. The method of claim 17 comprising allocating said slice for bidirectional P2P communication.

20. The method of claim 17 comprising truncating a particular tooth, if there is no data to be transferred.

21. The method of claim 17 comprising truncating a particular slice, if there is no data to be transferred.

22. The method of claim 17 comprising allocating a tooth for P2P communication between a source station and a destination station during a contention-based-access-period (CBAP) allocated to said source and destination stations.

23. The method of claim 22 comprising allocating a slice within said tooth by a transmit-opportunity (TxOP).

24. The method of claim 23 comprising announcing said TxOP by said source station, and allowing said destination station to transmit during said TxOP.

25. A system comprising:
at least one wireless communication device including:
one or more antennas; and
a wireless communication unit to perform wireless peer-to-peer (P2P) communication via said one or more antennas according to a time allocation scheme, which defines a plurality of scheduled allocations (teeth) for wireless P2P communication within a wireless communication network based on a predefined priority scheme, the priority scheme assigns a plurality of priorities to a plurality of streams corresponding to a plurality of service types,
wherein each tooth is scheduled for P2P communication between a pair of endpoints of the wireless communication network,
and wherein each tooth includes one or more contiguous portions (slices), each slice having a predefined duration allocated for communication of one or more streams having the same priority.

26. The system of claim 25, wherein one or more parameters of said teeth and slices are defined based on one or more parameters of said plurality of streams.

27. The system of claim 25, wherein a tooth is allocated for P2P communication between a source station and a destination station, wherein said tooth is allocated during a contention-based-access-period (CBAP) allocated to said source and destination stations, and wherein a slice within said tooth is allocated by a transmit-opportunity (TxOP).

28. A product including a non-transitory storage medium having stored thereon instructions that, when executed by a machine, result in:
communicating within a wireless communication network according to a time allocation scheme, which defines a plurality of scheduled allocations (teeth) for wireless peer-to-peer (P2P) communication based on a predefined priority scheme, the priority scheme assigns a plurality of priorities to a plurality of streams corresponding to a plurality of service types,
wherein each tooth is scheduled for P2P communication between a pair of endpoints of the wireless communication network,
and wherein each tooth includes one or more contiguous portions (slices), each slice having a predefined duration allocated for communication of one or more streams having the same priority.

29. The product of claim 28, wherein said instructions result in allocating a tooth for P2P communication between a source station and a destination station during a contention-based-access-period (CBAP) allocated to said source and destination stations, and allocating a slice within said tooth by a transmit-opportunity (TxOP).

30. The product of claim 28, wherein said priority scheme assigns a first priority to control streams, a second priority, lesser than said first priority, to audio streams, and at least a third priority, lesser than said second priority, to other streams.

* * * * *